(12) United States Patent
Chen

(10) Patent No.: US 10,082,833 B2
(45) Date of Patent: Sep. 25, 2018

(54) FLEXIBLE DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventor: Donghua Chen, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/642,135

(22) Filed: Jul. 5, 2017

(65) Prior Publication Data
US 2018/0181164 A1   Jun. 28, 2018

(30) Foreign Application Priority Data

Jan. 28, 2016   (CN) .......................... 2016 1 1239476

(51) Int. Cl.
*G06F 1/16*   (2006.01)
(52) U.S. Cl.
CPC .......... *G06F 1/1652* (2013.01); *G06F 1/1624* (2013.01)
(58) Field of Classification Search
CPC .............................. G06F 1/1624; G06F 1/1652
See application file for complete search history.

(56) References Cited

U.S. PATENT DOCUMENTS

| 2006/0082518 | A1* | 4/2006 | Ram | G06F 1/1601 345/1.1 |
| 2013/0058063 | A1* | 3/2013 | O'Brien | G06F 1/1624 361/807 |
| 2014/0092566 | A1* | 4/2014 | Shirasaka | H05K 5/0017 361/749 |
| 2016/0070303 | A1* | 3/2016 | Lee | G06F 1/1616 361/679.27 |

FOREIGN PATENT DOCUMENTS

CN            101685581 A      3/2010

* cited by examiner

*Primary Examiner* — Anthony Q Edwards
(74) *Attorney, Agent, or Firm* — Alston & Bird LLP

(57) ABSTRACT

The invention discloses a flexible display device including a fixed plate, a slidable plate, and a flexible display panel, wherein the slidable plate slides relative to the fixed plate with a bottom surface overlying the fixed plate; the flexible display panel disposed on the top surface of the slidable plate, wherein the flexible display panel includes a primary display section, and a secondary display section attached to the primary display section, wherein the secondary display section is foldable and retractable, wherein the primary display section is fastened to the top surface of the slidable plate; and wherein while the slidable plate slides relative to the fixed plate, the primary display section brings the retractable secondary display section between a folded position and an expanded position, and the fixed plate supports the primary display section and the secondary display section.

14 Claims, 7 Drawing Sheets

FLEXIBLE DISPLAY DEVICE

This application claims the benefit of Chinese Patent Application No. CN201611239476.6, filed with the State Intellectual Property Office of People's Republic of China on Dec. 28, 2016, and entitled "Flexible Display Device", the content of which is hereby incorporated by reference in its entirety.

FIELD

The present application relates to the field of display devices, and particularly to a flexible display device.

BACKGROUND

As the sciences and technologies are advancing constantly, mobile phones, tablet computers, and various other mobile terminals have been developed rapidly, and are playing a more critical role in our lives, working, entertainment, and various other aspects. As demand is growing constantly, the structure, appearance, performance, and various other aspects of the mobile terminals are also updated frequently.

Taking a mobile phone as an example, after a user activates an input method in a short message interface, almost half the area of a screen is occupied by the interface of the input method, thus greatly reducing the amount of information available to the user, and consequently degrading the experience of the user. Moreover if two interfaces are displayed on the screen of the mobile phone, for example, a video playing interface and a chatting interface both are opened on the screen, then the available area of each interface will be small due to the limited size of the screen, thus hindering more details from being presented, and also discoursing the user from operating other programs.

Accordingly it is highly desirable for those skilled in the art to address the technical problem of how to provide a number of available sizes of the screen so as to make it possible to provide the user with more information to be presented.

SUMMARY

Embodiments of the disclosure provide a flexible display device which presents more information to a user with a number of screens of available sizes.

A flexible display device according to an embodiment of the invention includes: a fixed plate; a slidable plate having a top surface and a bottom surface, wherein the slidable plate slides relative to the fixed plate with the bottom surface overlying the fixed plate; and a flexible display panel disposed on the top surface of the slidable plate, wherein the flexible display panel comprises a primary display section, and a secondary display section attached to the primary display section, wherein the secondary display section is foldable and retractable, wherein the primary display section is fastened to the top surface the side of the slidable plate away from the fixed plate; wherein while the slidable plate is sliding relative to the fixed plate, the primary display section brings the retractable secondary display section between a folded position and an expanded position, and wherein the fixed plate supports the primary display section and the secondary display section expanded.

Preferably in the flexible display device according to this embodiment, the fixed plate includes a bottom plate section, and a first grid section with girds located on the side of the bottom plate section proximate to the slidable plate, wherein the grids are arranged along the sliding direction of the slidable plate, and wherein the slidable plate further includes a second grid section with grids arranged in the sliding direction of the slidable plate, and cross-slidable relative to the first grid section, wherein the surfaces of the first grid section and the second grid section proximate to the flexible display panel are located in the same plane.

Preferably in the flexible display device according to this embodiment, the slidable plate is arranged overlying the bottom plate section, and wherein the surface of the slidable plate away from the bottom plate section, and the top surface of the first grid section proximate to the flexible display panel define a planar surface.

Preferably the top surfaces of the fixed plate and the slidable plate proximate to the flexible display panel are located in the same plane.

Optionally there is a reel arranged on an end of the fixed plate, and the secondary display section of the flexible display panel can be rolled and retracted into the reel.

Optionally there is an accommodating canister arranged on an end of the fixed plate, and the secondary display section of the flexible display panel can be retracted into the accommodating canister.

Optionally there is a sliding groove arranged on the side of the fixed plate away from the slidable plate in the sliding direction of the slidable plate, and a slidable rod arranged slidable in the sliding groove, and the secondary display section of the flexible display panel is connected with the slidable rod.

Preferably the flexible display device further includes: a reset spring configured to bring the secondary display section into the folding position and retracted, when the slidable plate is sliding backward relative to the fixed plate, and a locking mechanism configured to keep the secondary display section in the expansion position, while the slidable plate is sliding forward relative to the fixed plate to a preset position.

Optionally the locking mechanism is a position-limiting section arranged on the side of the slidable plate proximate to the fixed plate, and configured to protrude from the side surface of the slidable plate proximate to the fixed plate.

Optionally the locking mechanism includes a protrusion arranged on the side of the slidable plate proximate to the fixed plate, and wherein a recession arranged on the side of the fixed plate proximate to the slidable plate, and corresponds to the protrusion.

Optionally the locking mechanism includes a protrusion arranged on the side of the fixed plate proximate to the slidable plate, and a recession arranged on the side of the slidable plate proximate to the fixed plate, and corresponds to the protrusion.

Preferably there is a protrusion on the end surface of the slidable plate parallel to the sliding direction.

Preferably the flexible display device further includes a drive motor configured to drive the slidable plate to be slid relative to the fixed plate, and wherein the flexible display panel is electrically connected with the drive motor, and configured to control the drive motor, in response to a received instruction to expand the secondary display section, to drive the slidable plate to be slide forward relative to the fixed plate; and to control the drive motor, in response to a received instruction to retract the secondary display section, to drive the slidable plate to be slide backward relative to the fixed plate.

Preferably in any one of the technical solutions, the flexible display panel is a flexible touch display screen.

Particularly in any one of the technical solutions, the flexible display panel is an organic light-emitting diode display screen.

The flexible display panel in the flexible display device according to the embodiments of the invention includes the primary display section and the secondary display section, where the secondary display section can be foldable and retractable, and if the user needs the display screen with a large size, then the slidable plate may slide forward relative to the fixed plate to thereby bring the secondary display section into being expanded, so that if the user watches a video, or operates to divide the screen, then the flexible display device can present the user with interface details more clearly to thereby make it convenient for the user to operate, and also present the user with more information; and if the user does not need the display screen with a larger size, then the slidable plate will be slid backward relative to the fixed plate to thereby bring the secondary display section back into being folded and retracted, so that the user can simply operate on the primary display section as the display screen.

DETAILED DESCRIPTION OF THE EMBODIMENTS

In order to provide a number of screens of available sizes to present a user with more information, embodiments of the invention provide a flexible display device. Objections, technical solutions, and advantages of the invention will be more clear if described in details with figures and examples.

Figure 1:
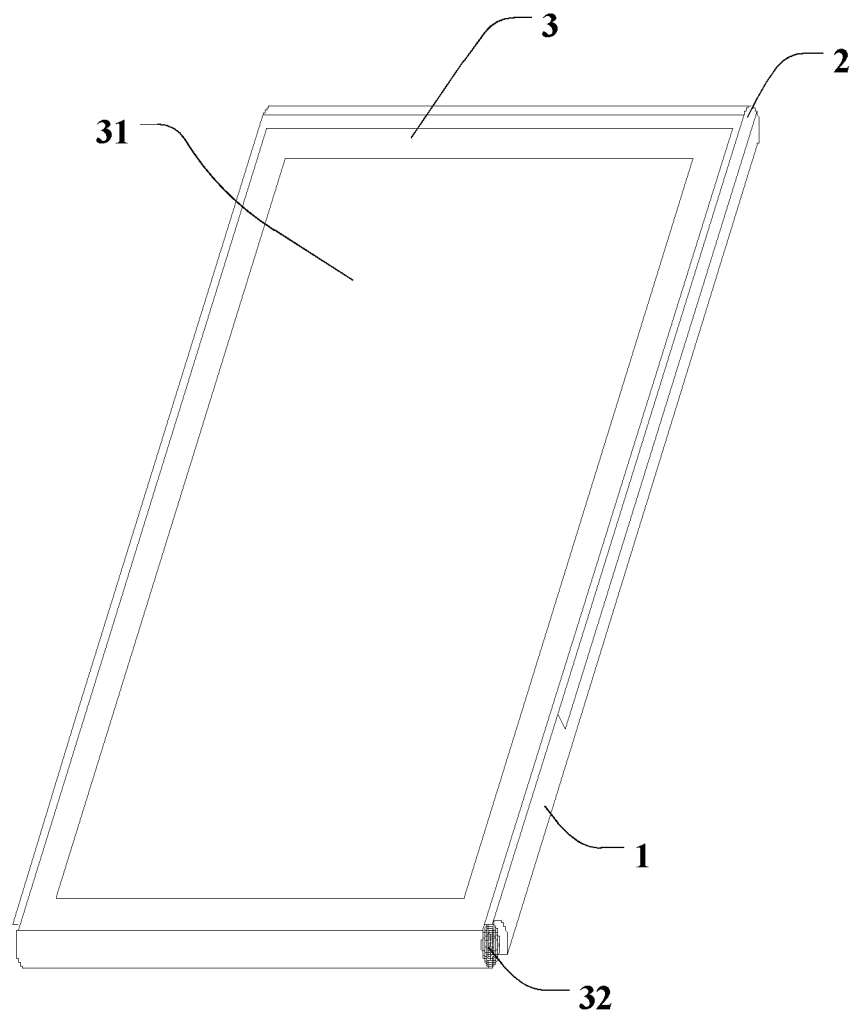
FIG. 1 is a schematic structural diagram of a flexible display device including a secondary display section which is retracted according to an embodiment of the invention.
Figure 2:
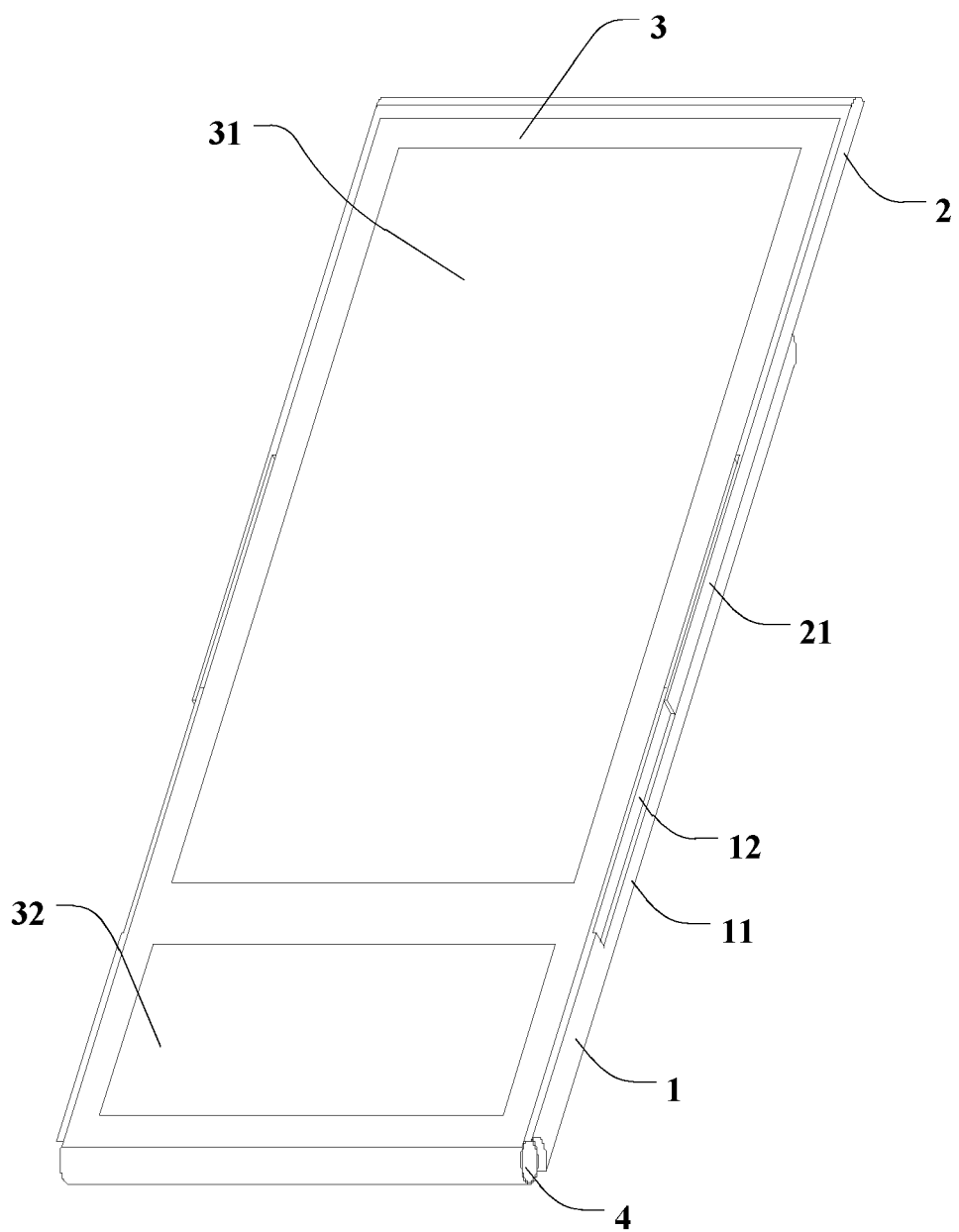
FIG. 2 is a schematic structural diagram of the flexible display device including the secondary display section which is expanded according to the embodiment of the invention.

FIG. 1 is a schematic structural diagram of a flexible display device including a secondary display section which is retractable according to an embodiment of the invention; and FIG. 2 is a schematic structural diagram of a flexible display device including a secondary display section which is expanded according to an embodiment of the invention.

As illustrated in FIG. 1 and FIG. 2, the flexible display device according to the embodiment of the invention includes: a fixed plate 1, a slidable plate 2, and a flexible display panel 3, where the slidable plate 2 has a top surface and a bottom surface and slides relative to the fixed plate 1 with the bottom surface overlying and moveable the fixed plate.

The flexible display panel 3 disposed on the top surface of the slidable plate, wherein the flexible display panel includes a primary display section 31, and a secondary display section 32 attached to the primary display section 31, and foldable and retractable, where the primary display section 31 is fastened to the top surface of the slidable plate 2; and while the slidable plate 2 is sliding forward relative to the fixed plate 1, the primary display section 31 brings the retractable secondary display section 32 from a hidden position—folded and retracted—out into expansion to be the same plane as the primary display section 31; and while the slidable plate 2 is sliding backward relative to the fixed plate 1, the secondary display section 32 is folded and retracted again.

In the flexible display device according to the embodiment of the invention, the flexible display panel 3 includes the primary display section 31 and the secondary display section 32, where the primary display section 31 is fastened to the top surface of the slidable plate 2, and particularly the primary display section 31 can be affixed thereto; and the end of the primary display section 31 away from the secondary display section 32 can be fastened to the top surface of the slidable plate 2, or a peripheral section of the primary display section 31 can be fastened to the top surface of the slidable plate 2, or the entire backside of the primary display section 31 can be fastened to the top surface of the slidable plate 2, as long as the primary display section 31 is fastened to the top surface of the slidable plate 2 in any way without hindering the slidable plate 2 from moving relative to the fixed plate 1, although the way in which the primary display section 31 is fastened to the top surface of the slidable plate 2 will not be enumerated here. In this embodiment, and while the slidable plate 2 is sliding relative to the fixed plate 1, the primary display section 31 brings the retractable secondary display section 32 between a folded position and an expanded position, and the fixed plate 1 supports the primary display section 31 and the secondary display section 32 expanded.

In this embodiment, the surface of the slidable plate 2 adhered to the primary display section 3 is arranged as a planar plane, or in another embodiment, the surface of the slidable plate 2 adhered to the primary display section 3 can alternatively be designed as a curved surface, and since the flexible display device 3 is foldable, it can be well adhered to the slidable plate 2 to thereby display on the curved surface.

In this embodiment, the secondary display section 32 can be foldable and retractable, and if the user needs a display screen with a large size, then as illustrated in FIG. 2, the slidable plate 2 may slide forward relative to the fixed plate 1 to thereby bring the secondary display section 32 into being expanded, so that if the user watches a video, or operates to divide the screen, then the flexible display device can present the user with interface details more clearly to thereby make it convenient for the user to operate, and also present the user with more information; and if the user does not need the display screen with a larger size, then as illustrated in FIG. 1, the slidable plate 2 will slide backward relative to the fixed plate 1 to thereby bring the secondary display section 32 back into being folded and retracted, so that the user can simply operate on the primary display section 31 as the display screen. Of course, the user can also operate normally on the primary display section 31 as the display screen.

It shall be noted that "sliding forward" as referred to in the context of this application refers to the slidable plate 2 sliding in such a direction that there is a decreasing overlapping area between the slidable plate 2 and the fixed plate 1, i.e., such a direction the slidable plate 2 can bring the secondary display section 32 into being expanded; and "sliding backward" refers to the slidable plate 2 sliding in such a direction that there is an increasing overlapping area between the slidable plate 2 and the fixed plate 1, i.e., such a direction the slidable plate 2 can bring the secondary display section 32 into being folded and retracted.

Particularly the slidable plate 2 is arranged overlying, and slidable relative to, the fixed plate 1 with the bottom surface, that is, the slidable plate 2 is arranged overlying the fixed plate 1, and the slidable plate 2 can be slidable relative to the fixed plate 1. The slidable plate 2 can be arranged slidable relative to the fixed plate 1 in any particular appropriate structure, e.g., a rail-and-guiding groove cooperating structure, where the slidable plate 2 is arranged with a rail, and the fixed plate 1 is arranged with a guiding groove cooperating with the rail of the slidable plate 2; or the fixed plate is arranged with a rail, and the slidable plate 2 is arranged with a guiding groove cooperating with the rail of the fixed plate 1.

Figure 5:
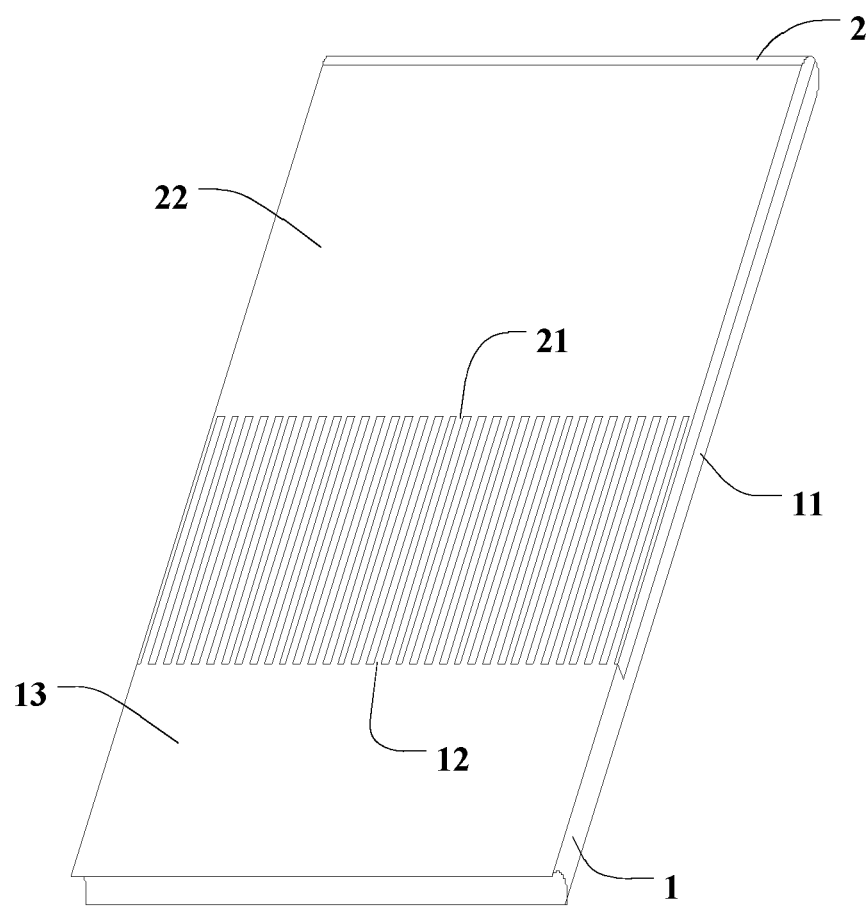
FIG. 5 is a schematic structural diagram of a flexible display device including a slidable plate before sliding according to another embodiment of the invention.
Figure 6:
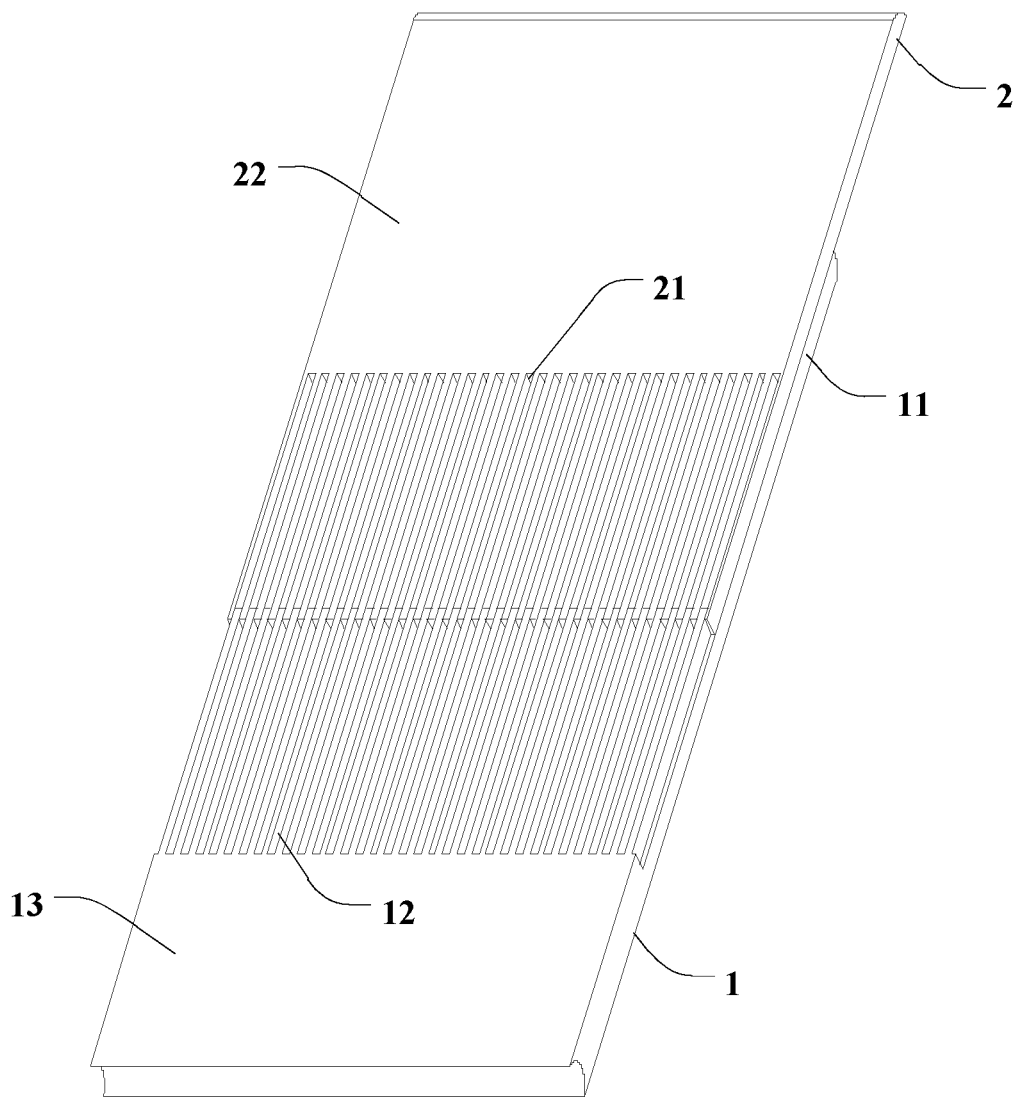
FIG. 6 is a schematic structural diagram of a flexible display device including a slidable plate when sliding according to another embodiment of the invention.

FIG. 5 is a schematic structural diagram of a flexible display device including a slidable plate before sliding according to a further embodiment of the invention; and FIG. 6 is a schematic structural diagram of the flexible display device including the slidable plate when sliding according to the further embodiment of the invention.

As illustrated in FIG. 5 and FIG. 6, in order to better illustrate structural features, the flexible display panel has been omitted instead of being illustrated. In a preferred embodiment, the slidable plate 2 can alternatively be arranged overlying, and slidable relative to, the fixed plate 1 in a grid-cross-slidable cooperating structure, where the fixed plate 1 includes a bottom plate section 11, and a first grid section 12 with girds located on the side of the bottom plate section 11 proximate to the slidable plate 2, and wherein the grids are arranged along the sliding direction of the slidable plate 2, and the slidable plate 2 includes a second grid section 21 with grids arranged in the sliding direction of the slidable plate 2, and cross-slidable relative to the first grid section 12, where the surfaces of the first grid section 12 and the second grid section 21 proximate to the flexible display panel 3 are located in the same plane.

As illustrated in FIG. 5 and FIG. 6, the slidable plate 2 is arranged overlying the bottom plate section 11, where the bottom plate section 11 is L-shaped in structure, and the slidable plate 2 is arranged on a thinner section of the bottom plate section 11, so that the fixed plate 1 and the slidable plate 2 can constitute a cuboid structure into which the secondary display section can be easily retractable by the user. The surface of the slidable plate 2 away from the bottom plate section 11, and the top surface of the first grid section 12 proximate to the flexible display panel 3 define such a planar surface that the flexible display panel 3 can be provided with a planar support plane.

In this embodiment, respective grids of the second grid section 21, and respective grids of the first grid section 12 are arranged alternately, so that the stability of sliding between the slidable plate 2 and the fixed plate 1 can be improved. Since the gap between the grids of the first grid section 12 and the gap between the grids of the second grid section 21 can be arranged smaller, while the slidable plate 2 is sliding forward relative to the fixed plate 1, the first grid section 12 and the second grid section 21 can also well provide the flexible display panel 3 with a planar support, so the flexible display panel 3 will be prevented from being not provided with any support structure, and furthermore although the slidable plate 2 is moved relative to the fixed plate 1 no matter whether the secondary display section is expanded or retracted, the slidable plate 2 and the fixed plate 1 can provide the flexible display panel 3 with a support all the time due to the grid structures.

Still referring to FIG. 5 and FIG. 6, in a particular embodiment, the top surfaces of the fixed plate 1 and the slidable plate 2 proximate to the flexible display panel 3 are located in the same plane, that is, no matter whether the slidable plate 2 is not slid relative to the fixed plate 1 to bring the secondary display section 32 into being retracted, or the slidable plate 2 is slid forward relative to the fixed plate 1 to bring the secondary display section 32 into being expanded, the support surface of the flexible display panel 3 is a plane. For example, particularly in the embodiment above where the slidable plate 2 and the grids of fixed plate 1 are slid in cooperation with each other, upper surfaces of a first grid section fixed section 13 of the fixed plate 1, the first grid section 12, a second grid section fixed section 22 of the slidable plate 2, and the second grid section 21 are located in the same plane, and no matter how the slidable plate 2 is slid relative to the fixed plate 1, the support surface of the flexible display panel 3 is a plane. If the slidable plate 2 is slid relative to the fixed plate 1 in the rail-and-guiding-groove cooperating structure, then all the upper surfaces of the fixed plate 1, the rail, the guiding groove, and the slidable plate 2 will be located in the same plane. In another embodiment, there is such a difference in height between the upper surfaces of the fixed plate and the slidable plate that ranges from 0 to 0.15 mm, so that the position of a step can be avoided from being observed by human eyes, and also a support for the flexible display panel 3 can be guaranteed properly.

A structure into which the secondary display section 32 is retractable can be as illustrated in FIG. 2, where there is a reel 4 arranged on the end of the fixed plate 1 away from the slidable plate 2 sliding forward, and the secondary display section 32 of the flexible display panel 3 can be rolled and retracted into the reel 4. Particularly one end of the secondary display section 32 of the flexible display panel 3 is fixed to the reel 4, and if the secondary display section 32 is folded and retracted, then it may be rolled onto the surface of the reel 4 to thereby be rolled and retracted into the reel 4; if the secondary display section 32 is being expanded, then it will be rolled off the surface of the reel 4; and if the secondary display section 32 is expanded completely, then it will be limited in position by the reel 4 on the end of the fixed plate 1.

Figure 3:
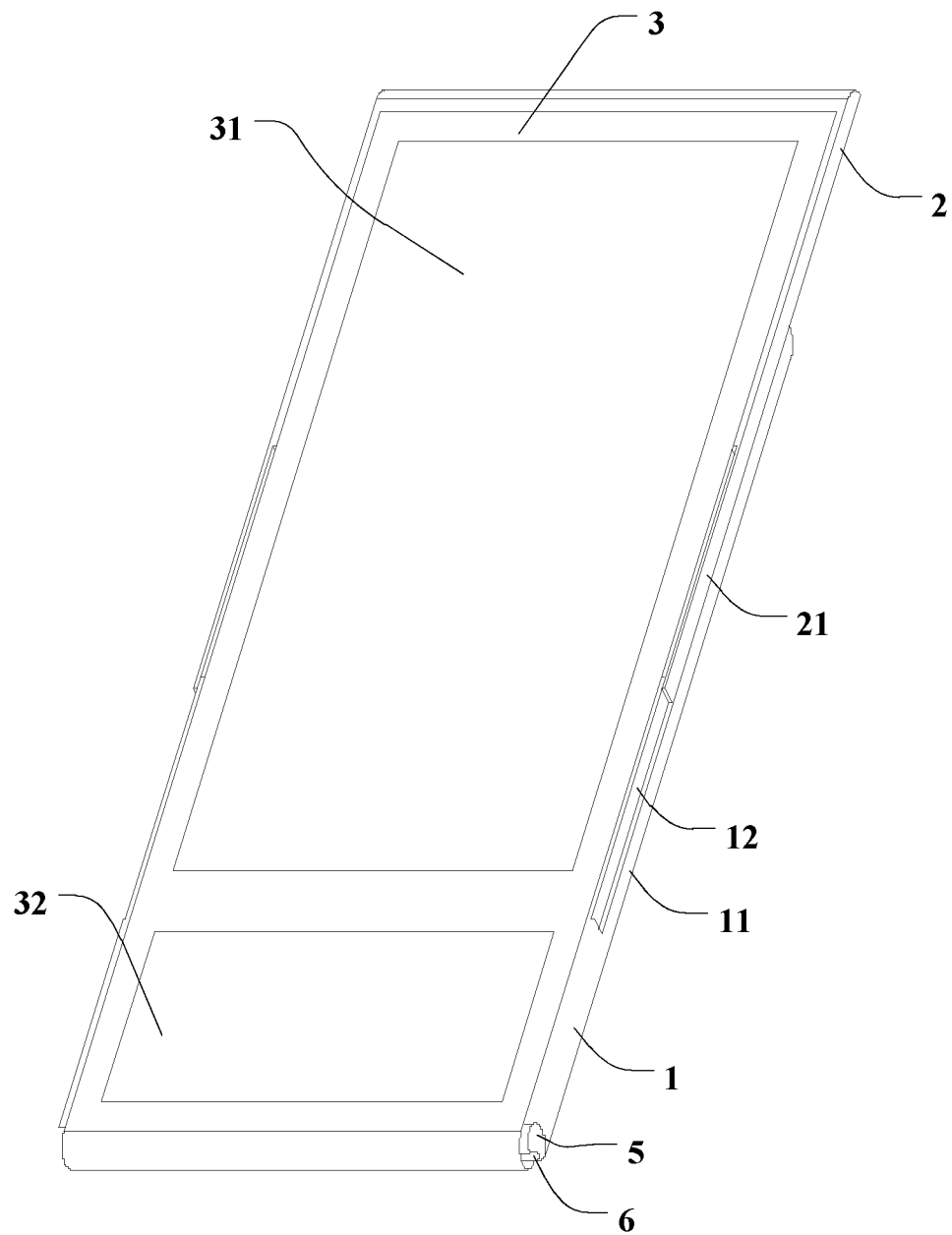
FIG. 3 is a schematic structural diagram of a flexible display device including a secondary display section which is expanded according to another embodiment of the invention.

FIG. 3 is a schematic structural diagram of a flexible display device including a secondary display section which is expanded according to another embodiment of the invention.

Different structural components in this embodiment from the embodiments above will be described below, and a detailed description of the other structural components thereof similar to those in the embodiments above will be omitted here. As illustrated in FIG. 3, there is an accommodating canister 5 arranged on the end of the fixed plate 1 away from the slidable plate 2 sliding forward, where the secondary display section 32 of the flexible display panel 3 can be retracted into the accommodating canister 5.

Particularly there is an opening of the accommodating canister 5, through which the secondary display section 32 of the flexible display panel 3 can pass. There is such a position-limiting structure 6 on one end of the secondary display section 32 of the flexible display panel 3 that can be limited in position in the accommodating canister 5, where if the secondary display section 32 is folded and retracted, then it may be rolled and retracted in the accommodating canister 5, and the position-limiting structure 6 may be located at the middle of the roll into which the secondary display section 32 is rolled; if the secondary display section 32 is being expanded, then the roll into which the secondary display section 32 is rolled will be expanded progressively; and if the secondary display section 32 is expanded completely, then the secondary display section 32 will be limited in position by the position-limiting structure 6 on the end of the fixed plate 1. More particularly the position-limiting structure 6 can be a position-limiting rod.

Figure 4:
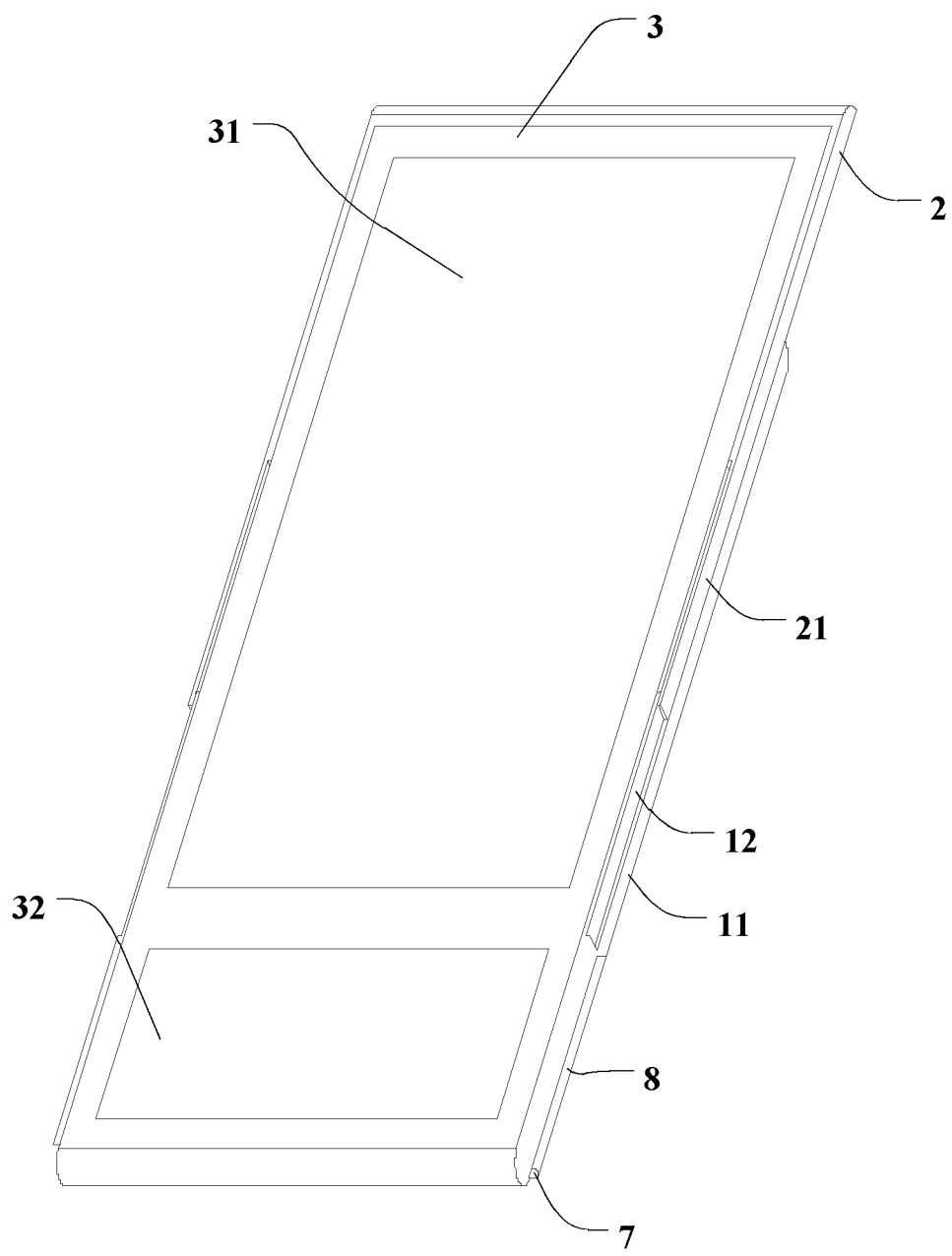
FIG. 4 is a schematic structural diagram of a flexible display device including a secondary display section which is expanded according to another embodiment of the invention.

FIG. 4 is a schematic structural diagram of a flexible display device including a secondary display section which is expanded according to a further embodiment of the invention.

Different structural components in this embodiment from the embodiments above will be described below, and a detailed description of the other structural components thereof similar to those in the embodiments above will be omitted here. For a structure according to this embodiment into which the secondary display section 32 is retractable, as illustrated in FIG. 4, there is a sliding groove 8 arranged on the side of the fixed plate 1 away from the slidable plate 2 in the sliding direction of the slidable plate 2, where the sliding groove is located on the end side proximate to the secondary display section. A slidable rod 7 is arranged slidable in the sliding groove 8, and the secondary display section 32 of the flexible display panel 3 is connected with the slidable rod 7.

In this embodiment, one end of the secondary display section 32 of the flexible display panel 3 is fixed to the slidable rod 7, and the slidable rod 7 is slid in the sliding groove 8 to thereby bring the secondary display section 32 into movement, where if the secondary display section 32 is folded and retracted, then the slidable rod 7 will move toward the middle of the fixed plate 1 to bring the secondary display section 32 into being folded and retracted into the side of the fixed plate 1 away from the slidable plate 2; if the secondary display section 32 is being expanded, then the slidable rod 7 will be moved toward the end of the fixed plate 1 away from the slidable plate 2 being moved forward; and if the secondary display section 32 is expanded completely, then the slidable rod 7 will be slid to the end of the fixed plate 1 away from the slidable plate 2 being moved forwarded, and limited in position on that end.

Particularly the number of sliding grooves 8 may be one, and there is such a slidable section at the middle of the slidable rod 7 that cooperates with the sliding groove 8; or the number of sliding grooves 8 may be two, and there are such slidable sections on both ends of the slidable rod 7 that cooperate with the sliding grooves 8. Of course, the number of sliding grooves 8 will not be limited thereto here.

In a preferred embodiment, the flexible display device further includes: a reset spring configured to bring the secondary display section 32 into the folding position and retracted, when the slidable plate 2 slides backward relative to the fixed plate 1, and a locking mechanism configured to keep the secondary display section 32 in the expansion position, when the slidable plate 2 slides forward relative to the fixed plate 1.

If the secondary display section 32 can be rolled and retracted into the reel 4, then the reset spring will be a planar coiled spring including an inner end fixed to the reel 4, and an outer end fixed to the end of the secondary display section 32 which is not connected with the reel 4, and if the secondary display section 32 is expanded, then the outer end of the planar coiled spring will be pulled by the secondary display section 32, and strained; and if the secondary display section 32 is retracted, then the secondary display section 32 will be retracted due to the elastic action of the planar coiled spring to thereby be rolled into the reel 4.

If the secondary display section 32 can be retracted into the accommodating canister 5, then the reset spring may still be a planar coiled spring including an inner end fixed to the position-limiting structure 6, and an outer end fixed to the end of the secondary display section 32 which is not connected with the position-limiting structure 6, and if the secondary display section 32 is expanded, then the outer end of the planar coiled spring will be pulled by the secondary display section 32, and strained; and if the secondary display section 32 is retracted, then the secondary display section 32 will be retracted due to the elastic action of the planar coiled spring to thereby be rolled into the reel 4.

If the secondary display section 32 is folded and retracted into the side of the fixed plate 1 away from the slidable plate 2, then the reset spring can be a tensile spring including one end fixed to the slidable rod 7, and the other end fixed to the end of the fixed plate 1 facing the slidable plate 2 sliding forward, and if the secondary display section 32 is expanded, then the tensile spring will be tensioned, and subjected to a force; and if the secondary display section 32 is retracted, then the slidable rod 7 connected with the secondary display section 32 will bring the secondary display section 32 into be retracted, due to the elastic action of the tensile spring, and the secondary display section 32 will be folded and retracted into the side of the fixed plate 1 away from the slidable plate 2. Alternatively the reset spring can be a compressive spring including one end fixed to the slidable rod 7, and the other end fixed to the end of the fixed plate 1 away from the slidable plate 2 sliding forward, and if the secondary display section 32 is expanded, then the compressive spring will be compressed, and subjected to a force; and if the secondary display section 32 is retracted, then the slidable rod 7 connected with the secondary display section 32 will bring the secondary display section 32 into be retracted, due to the elastic action of the compressive spring, and the secondary display section 32 will be folded and retracted into the side of the fixed plate 1 away from the slidable plate 2

The locking mechanism can be a position-limiting section arranged on the side of the slidable plate 2 proximate to the fixed plate 1, and protruding from the side surface of the slidable plate 2 proximate to the fixed plate 1. Particularly the position-limiting section can be hinged on the side of the slidable plate 2 proximate to the fixed plate 1, where the slidable plate 2 includes an accommodating space into which the position-limiting section is retractable, and the position-limiting section can be retracted into the accommodating space without protruding from the surface of the slidable plate 2, that is, without preventing the slidable plate 2 from being arranged overlying, and slidable relative to, the fixed plate 1. If the secondary display section 32 is expanded, then the slidable plate 2 will be slid forward relative to the fixed plate 1 to a preset position, and the accommodating space arranged on the side of the slidable plate 2 proximate to the fixed plate 1, into which the position-limiting section is retractable, will be exposed, and the user will pivot the position-limiting section out of the accommodating space against the end of the fixed plate 1 facing the slidable plate 2 sliding forward, so that the slidable plate 2 is fixed relative to the fixed plate 1; and if the secondary display section 32 is retracted, then the user will simply pivot the position-limiting section back into the accommodating space.

Figure 7:
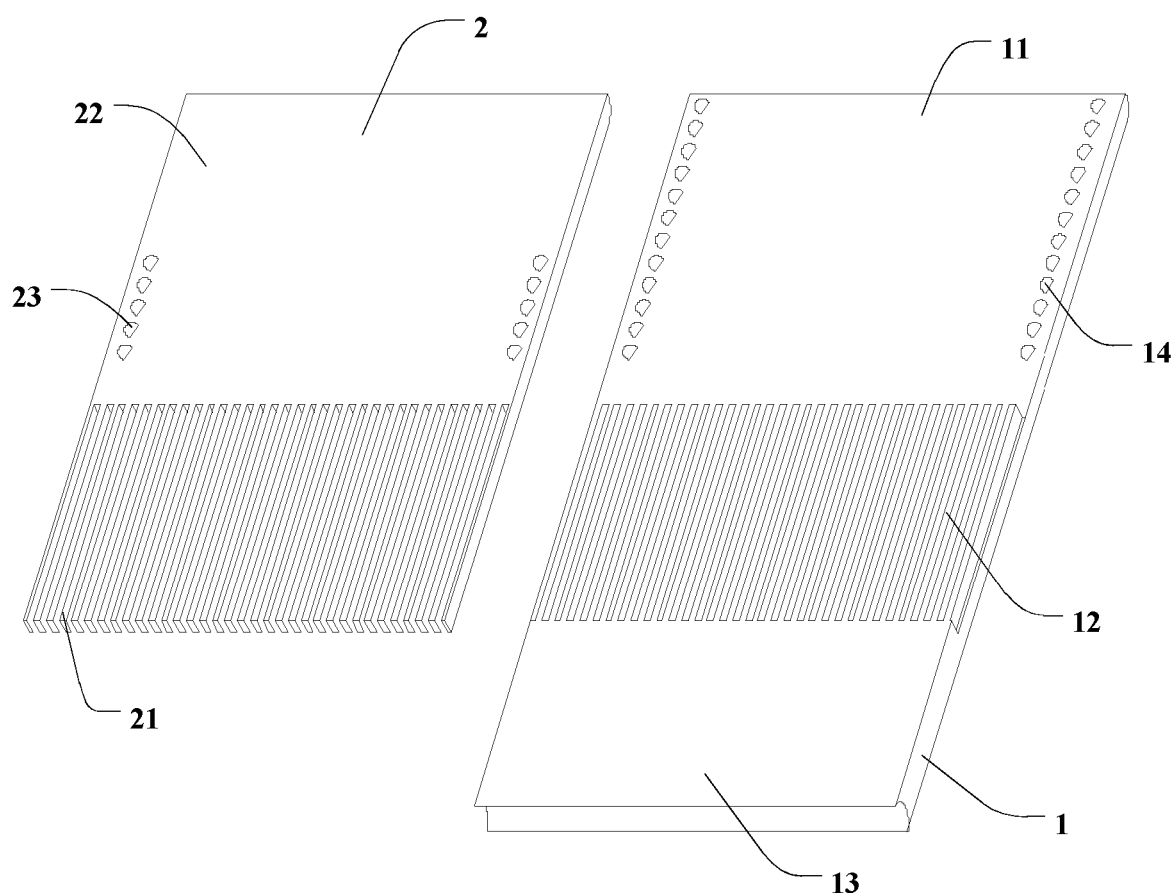
FIG. 7 is a schematic diagram of a slidable plate before and after the slid-out part is removed according to another embodiment of the invention.

FIG. 7 is a schematic diagram of the slidable plate which is removed according to the further embodiment of the invention.

Different structural components in this embodiment from the embodiments above will be described below, and a detailed description of the other structural components thereof similar to those in the embodiments above will be omitted here. As illustrated in FIG. 7, the locking mechanism can further include a protrusion 23 arranged on the side of the slidable plate 2 proximate to the fixed plate 1, and a recess 14 arranged on the side of the fixed plate 1 proximate to the slidable plate 2, and corresponds to the protrusion 23. In a preferred embodiment, there are a number of protrusions 23 arranged on the side of the slidable plate 2 proximate to the fixed plate 1 in the sliding direction, and as illustrated in FIG. 7, there are protrusions 14, the number of which is more than the number of protrusions 23, arranged on the side of the fixed plate 1 proximate to the slidable plate 2; and if the secondary display section 32 is retracted, then the protrusion 23 will be located in the corresponding recess 14, and if the secondary display section 32 is expanded, then the user will slide the slidable plate 2 forward, and the protrusion 23 will be moved toward the recess 14 located in the forward sliding direction, where the user can stop the slidable plate 2 from sliding when the flexible display panel 3 is sized as desirable, so that the protrusion 23 and the concave 14 cooperate with each other to have the slidable plate 2 fixed relative to the fixed plate 1, and the secondary display section 32 is expanded; and if the secondary display section 32 is retracted, then the user will simply slide the slidable plate 2 backward. Of course, in a particular embodiment, the number of protrusions 23 may be the same as the number of recesses 14. Particularly the protrusion 23 can be a protrusion made of a rubber material, where the protrusion 23 made of the rubber material is highly elastic, and there is a significant friction force on the surface thereof, so that the protrusion 23 can cooperate stably with the recess 14 without easily falling out of the recess. Of course, alternatively in the embodiment above, the protrusion 23 is located on the side of the fixed plate 1 proximate to the slidable plate 2, and the recess 14 is located on the side of the slidable plate 2 proximate to the fixed plate 1.

In another embodiment, the locking mechanism of the slidable plate 2 and the fixed plate 1 can alternatively be a groove and a locking head for limiting in position, where the locking head can be arranged on the surface of the slidable plate 2 facing the fixed plate 1, and the groove can be arranged on the surface of the fixed plate 1 facing the slidable plate 2; and the locking head can be engaged into the groove, and movable in the groove, and if the flexible display panel 3 is moved to some position, then a fixing mechanism in the groove will fix the locking head to thereby fix the size of the screen. With this design, the flexible display panel 3 can be positioned conveniently without hindering the slidable plate 2 from being moved stably on the fixed plate 1.

In a preferred embodiment, there is a protruding section on the end surface of the slidable plate 2 parallel to the sliding direction. The user can push and pull the protruding section, so that the slidable plate 2 is moved relative to the fixed plate 1, instead of pushing or pulling on the primary display section 31, thus protecting the primary display section 31, and improving the service lifetime of the display panel 3.

In a more preferred embodiment, the flexible display device further includes a drive motor configured to drive the slidable plate 2 to be slid relative to the fixed plate 1, where the flexible display panel 3 is electrically connected with the drive motor, and configured to control the drive motor, in response to a received instruction to expand the secondary display section 32, to drive the slidable plate 2 to slide forward relative to the fixed plate 1; and to control the drive motor, in response to a received instruction to retract the secondary display section 32, to drive the slidable plate 2 to slide backward relative to the fixed plate 1.

With the technique disclosed to this embodiment, the user can expand or retract the secondary display section 32 of the flexible display panel 3 simply by triggering related preset program, or clicking on a related button, of the flexible display device without forcibly pushing the slidable plate 2, thus resulting in convenient operations and a less effort of the user. For example, a control button of the secondary display section 32 is arranged, and if the user needs to expand the secondary display section 32, then he or she will trigger the button, so that the drive motor receives an instruction to expand the display section, and drives the slidable plate 2 to be slid forward relative to the fixed plate 1, thus expanding the secondary display section 32; and if the user needs to retract the secondary display section 32, then he or she will trigger the button again, so that the drive motor receives an instruction to retract the display section, and drives the slidable plate 2 to be slid backward relative to the fixed plate 1, thus retracting the secondary display section 32. The user himself or herself can further set an operation to control the drive motor, for example, if an input interface is activated, then an instruction to expand the secondary display section 32 will be sent to the drive motor, so that the drive motor drives the slidable plate 2 to slide forward relative to the fixed plate 1; and if the input interface is deactivated, then an instruction to retract the secondary display section 32 will be sent to the drive motor, so that the drive motor drives the slidable plate 2 to slide backward relative to the fixed plate 1, thus retracting the display section 32. Of course, the user can alternatively set another operation as an operation to control the drive motor, e.g., to divide the screen, to start a video player, to open a game interface, or another operation.

In a particular embodiment, the flexible display panel 3 of the flexible display device according to any one of the technical solutions above can alternatively be an integrated flexible touch display screen. Moreover the primary display section 31 can be arranged as a display component, and the secondary display section 32 can be arranged as an input component; and if the user needs to input information, then the secondary display section 32 will be expanded for a touch input operation thereon without changing the size of a picture displayed on the primary display section 31, thus well addressing the problem in the prior art that the area of the picture of the display image is occupied by the input interface in the display device.

In another particular embodiment, the flexible display panel 3 of the flexible display device in any one of the technical solutions above is an organic light-emitting diode display screen. The flexible display device further includes an integrated circuit chip configured to transmit a display signal.

The flexible display panel according to this embodiment includes a flexible substrate, and a drive circuit layer, a light-emitting element layer, and a thin film transistor package layer, which are arranged on one side of the flexible substrate in that order, where the light-emitting element layer includes an anode layer, an Organic Light-Emitting Diode (OLED) organic light-emitting material layer, and a cathode layer, where the anode layer is located between the drive circuit layer and the OLED organic light-emitting material layer, and the cathode layer is located between the OLED organic light-emitting material layer and the thin film transistor package layer. The flexible substrate can be made of Polyimide (PI), Polyethylene Terephthalate (PET), PolyCarbonate (PC), Polyethylene Naphthalate (PEN), Cyclic Olefins (COP), Polymethyl Methacrylate (PMMA), or another foldable material, so that the flexible display panel is highly foldable.

Those skilled in the art shall appreciate that the scope of the technical solutions according to the embodiments of the invention will not be limited to the technical solutions including the technical features above in their particular combinations, but also encompass other technical solutions including the technical features or their equivalents in any combinations as appropriate without departing the spirit of the invention, e.g., technical solutions including the technical features above replacing or replaced by the similarly functioning technical features disclosed in the embodiments of the invention (without any limitation thereto).

What is claimed is:

1. A flexible display device, comprising:
a fixed plate;
a slidable plate having a top surface and a bottom surface, wherein the slidable plate slides relative to the fixed plate with the bottom surface overlying the fixed plate; and
a flexible display panel disposed on the top surface of the slidable plate, wherein the flexible display panel comprises a primary display section, and a secondary display section attached to the primary display section, wherein the secondary display section is foldable and retractable, wherein the primary display section is fastened to the top surface of the slidable plate;
wherein while the slidable plate slides relative to the fixed plate, the primary display section brings the retractable secondary display section between a folded position and an expanded position, and wherein the fixed plate supports the primary display section and the secondary display section expanded; and
wherein the fixed plate comprises a bottom plate section, and a first grid section with girds located on the side of the bottom plate section proximate to the slidable plate, wherein the grids are arranged along the sliding direction of the slidable plate, wherein the slidable plate further comprises a second grid section with grids arranged in the sliding direction of the slidable plate, and cross-slidable relative to the first grid section, and wherein the surfaces of the first grid section and the second grid section proximate to the flexible display panel are located in the same plane.

2. The flexible display device according to claim 1, wherein the slidable plate is arranged overlying the bottom plate section, and wherein the surface of the slidable plate away from the bottom plate section, and the top surface of the first grid section proximate to the flexible display panel define a planar surface.

3. The flexible display device according to claim 1, wherein the top surfaces of the fixed plate and the slidable plate proximate to the flexible display panel are located in the same plane.

4. The flexible display device according to claim 1, further comprising a reel arranged on an end of the fixed plate, and the secondary display section of the flexible display panel can be rolled and retracted into the reel.

5. The flexible display device according to claim 1, wherein there is an accommodating canister arranged on an end of the fixed plate, and the secondary display section of the flexible display panel can be retracted into the accommodating canister.

6. The flexible display device according to claim 1, further comprising a sliding groove arranged on the side of the fixed plate away from the slidable plate in the sliding direction of the slidable plate, and a slidable rod arranged slidable in the sliding groove, and the secondary display section of the flexible display panel is connected with the slidable rod.

7. The flexible display device according to claim 1, further comprises: a reset spring configured to bring the secondary display section into the folding position and retracted, when the slidable plate slides backward relative to the fixed plate, and a locking mechanism configured to keep the secondary display section in the expansion position, when the slidable plate slides forward relative to the fixed plate to a preset position.

8. The flexible display device according to claim 7, wherein the locking mechanism is a position-limiting section arranged on the side of the slidable plate proximate to the fixed plate, and configured to protrude from the side surface of the slidable plate proximate to the fixed plate.

9. The flexible display device according to claim 7, wherein the locking mechanism comprises a protrusion arranged on the side of the slidable plate proximate to the fixed plate, and wherein a recession arranged on the side of the fixed plate proximate to the slidable plate, and corresponds to the protrusion.

10. The flexible display device according to claim 7, wherein the locking mechanism comprises a protrusion arranged on the side of the fixed plate proximate to the slidable plate, and a recession arranged on the side of the slidable plate proximate to the fixed plate, and corresponds to the protrusion.

11. The flexible display device according to claim 1, wherein there is a protrusion on the end surface of the slidable plate parallel to the sliding direction.

12. The flexible display device according to claim 1, further comprising a drive motor configured to drive the slidable plate to be slid relative to the fixed plate, and wherein the flexible display panel is electrically connected with the drive motor, and configured to control the drive motor, in response to a received instruction to expand the secondary display section, to drive the slidable plate to slide forward relative to the fixed plate; and to control the drive motor, in response to a received instruction to retract the secondary display section, to drive the slidable plate to slide backward relative to the fixed plate.

13. The flexible display device according to claim 1, wherein the flexible display panel is a flexible touch display screen.

14. The flexible display device according to claim 1, wherein the flexible display panel is an organic light-emitting diode display screen.

* * * * *